United States Patent [19]

Van Duyn et al.

[11] Patent Number: 4,916,586
[45] Date of Patent: Apr. 10, 1990

[54] MOUNTING BRACKET FOR HEADLAMP ASSEMBLY

[75] Inventors: Paul D. Van Duyn, Anderson; Michael E. O'Shaughnessey, Fort Wayne, both of Ind.; Alfred M. Allen, Palm Harbor, Fla.

[73] Assignee: General Motors Corporation, Detroit, Mich.

[21] Appl. No.: 386,924

[22] Filed: Jun. 26, 1989

Related U.S. Application Data

[63] Continuation of Ser. No. 237,805, Aug. 29, 1988, abandoned.

[51] Int. Cl.⁴ .............................................. B60Q 1/04
[52] U.S. Cl. ..................... 362/61; 362/287; 362/419; 362/80
[58] Field of Search ............... 362/61, 66, 80, 285, 362/287, 289, 418, 419, 420, 421, 422, 427, 478

[56] References Cited

U.S. PATENT DOCUMENTS

| | | | |
|---|---|---|---|
| 3,932,837 | 1/1976 | Baker | 362/419 |
| 4,343,031 | 8/1982 | Liebegott | 362/419 |
| 4,471,413 | 9/1984 | Dick | 362/421 |
| 4,722,033 | 1/1988 | Van Duyn et al. | 362/419 |
| 4,742,435 | 5/1988 | Van Duyn et al. | 362/80 |
| 4,774,639 | 9/1988 | Baker et al. | 362/287 |

FOREIGN PATENT DOCUMENTS 2437906 3/1975 Fed. Rep. of Germany ...... 362/285

Primary Examiner—Ira S. Lazarus
Assistant Examiner—D. M. Cox
Attorney, Agent, or Firm—Edward J. Biskup

[57] ABSTRACT

A headlamp assembly having a mounting bracket which is generally L-shaped in configuration and provides a three-point suspension for a lamp body and in which two of the points are longitudinally adjustable and are located on opposed legs of the bracket and the third point is fixed in position and is located at the intersection of the two legs of the bracket.

4 Claims, 3 Drawing Sheets

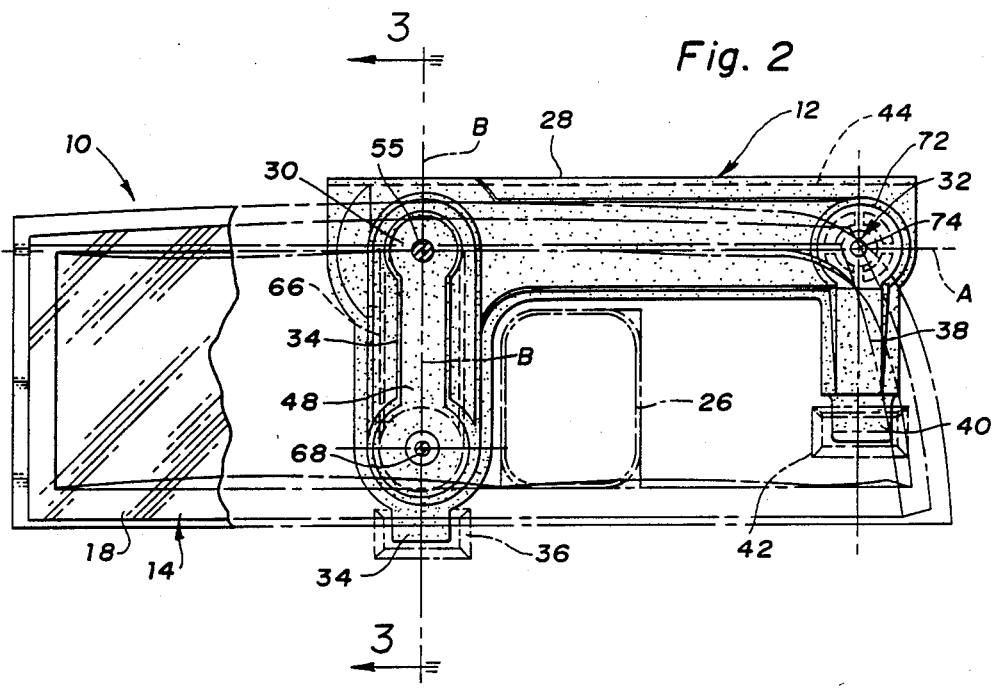
Fig. 2
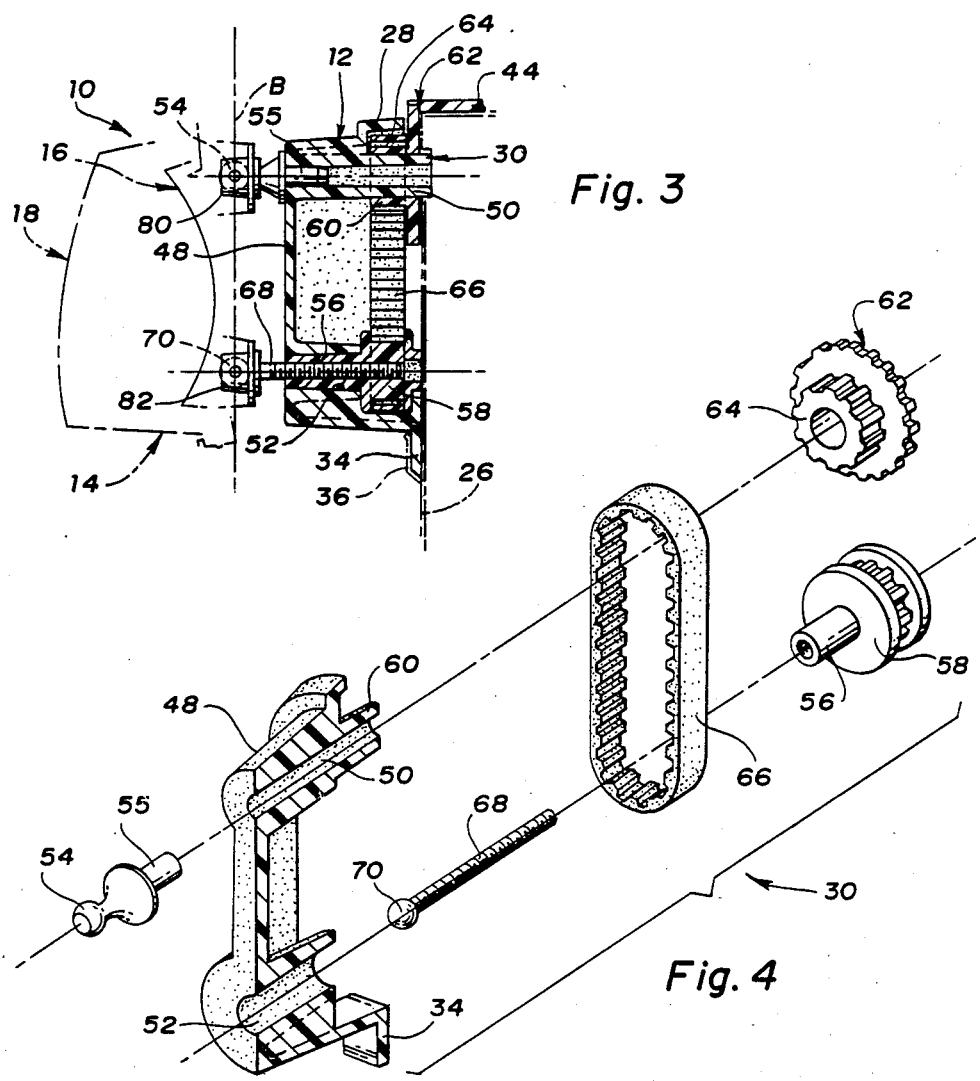
Fig. 3
Fig. 4

MOUNTING BRACKET FOR HEADLAMP ASSEMBLY

This is a continuation of application Serial 237,805 filed on August 29, 1988, now abandoned.

The invention concerns vehicle headlamps and more particularly a mounting bracket that includes adjustment mechanisms for such headlamps that allow the position of the headlamp to be adjusted by means accessible from above the headlamp.

The patent to Van Duyn et al 4,742,435, which is assigned to the assignee of this invention, discloses a headlamp assembly which includes a stanchion that serves to facilitate attachment of a lamp body of the composite type to the front end of a vehicle and allows selective adjustable movement of the lamp body about a vertical aim axis and a horizontal aim axis. The stanchion supports an adjustment mechanism which includes a pair of orthogonally arranged shafts which are interconnected by a pair of bevel gears in a gear housing so that upon rotation of a vertically orientated shaft, a drive nut is rotated resulting in longitudinal movement of a horizontally orientated shaft for adjusting the position of the lamp body about a horizontal aim axis. Also, a separate adjustment mechanism is provied at a point laterally spaced from the first adjustment mechanism that provides adjustment of the lamp body about a vertical aim axis.

The present invention concerns a headlamp assembly that is similar to the above decribed headlamp assembly but differs therefrom in that a common mounting bracket is provided for the two adjustment mechanisms instead of having separate adjustment mechanisms which are individually attached to the support panel of a vehicle. Thus, the pivotal connections between the lamp body and the two adjustment mechanisms are always located at the proper distance prior to and during attachment of the headlamp assembly to the vehicle. This facilitates attachment of the headlamp assembly to the vehicle.

More specifically, the headlamp assembly according to the present invention includes a mounting bracket supporting a lamp body for selective movement about a vertical aim axis and a horizontal aim axis. In the preferred form, the mounting bracket is generally L-shaped with one leg thereof supporting a first longitudinally adjustable ball pivot and also a fixed ball pivot the centers of each of which are located along the vertical aim axis. A second longitudinally adjustable ball pivot is supported by the other leg of the mounting bracket with its center being located along the horizontal aim axis so as to provide, together with the other two ball pivots, a three point suspension for the lamp body. In addition, each leg includes means formed therewith so as to facilitate attachment of the mounting bracket to a vehicle.

The objects of the present invention are to provide a new and improved headlamp assembly incorporating a mounting bracket for quickly connecting a headlamp body to a motor vehicle; to provide a new and improved headlamp assembly which includes a mounting bracket for attaching the assembly to a vehicle and for supporting a pair of adjustment mechanisms which provide selective adjustment of a lamp body about a horizontal aim axis and a vertical aim axis; to provide a new and improved headlamp assembly which includes a generally L-shaped mounting bracket that incorporates two adjustment mechanisms each of which causes longitudinal adjustable movement of a ball pivot and one of which has a fixed ball pivot so as to provide a three point suspension for a lamp body; and to provide a new and improved mounting bracket for a headlamp that is generally L-shaped in configuration and provides a three-point suspension for the headlamp and in which two of the points are longitudinally adjustable and are located on the opposed legs of the bracket and one of the points is fixed in position and is located at the intersection of the legs of the bracket.

Other objects and advantages of the present invention will be more apparent from the following detailed description when taken with the drawings in which FIG. 1 is a plan view of a headlamp assembly incorporating a mounting braket made in accordance with the present invention having certain parts broken away so as to more clearly show the construction of the invention;

FIG. 2 is an elevation view of the headlamp assembly of FIG. 1 taken on line 2—2 with a major portion of the lamp body shown in phantom line so as to reveal the construction of the mounting bracket;

FIG. 3 is a sectional view taken on line 3—3 of FIG. 2 showing one of the adjustment mechanisms incorporated with the mounting bracket;

FIG. 4 is an exploded perspective view showing the parts of the adjustment mechanism shown in FIG. 3.

Figure 1:
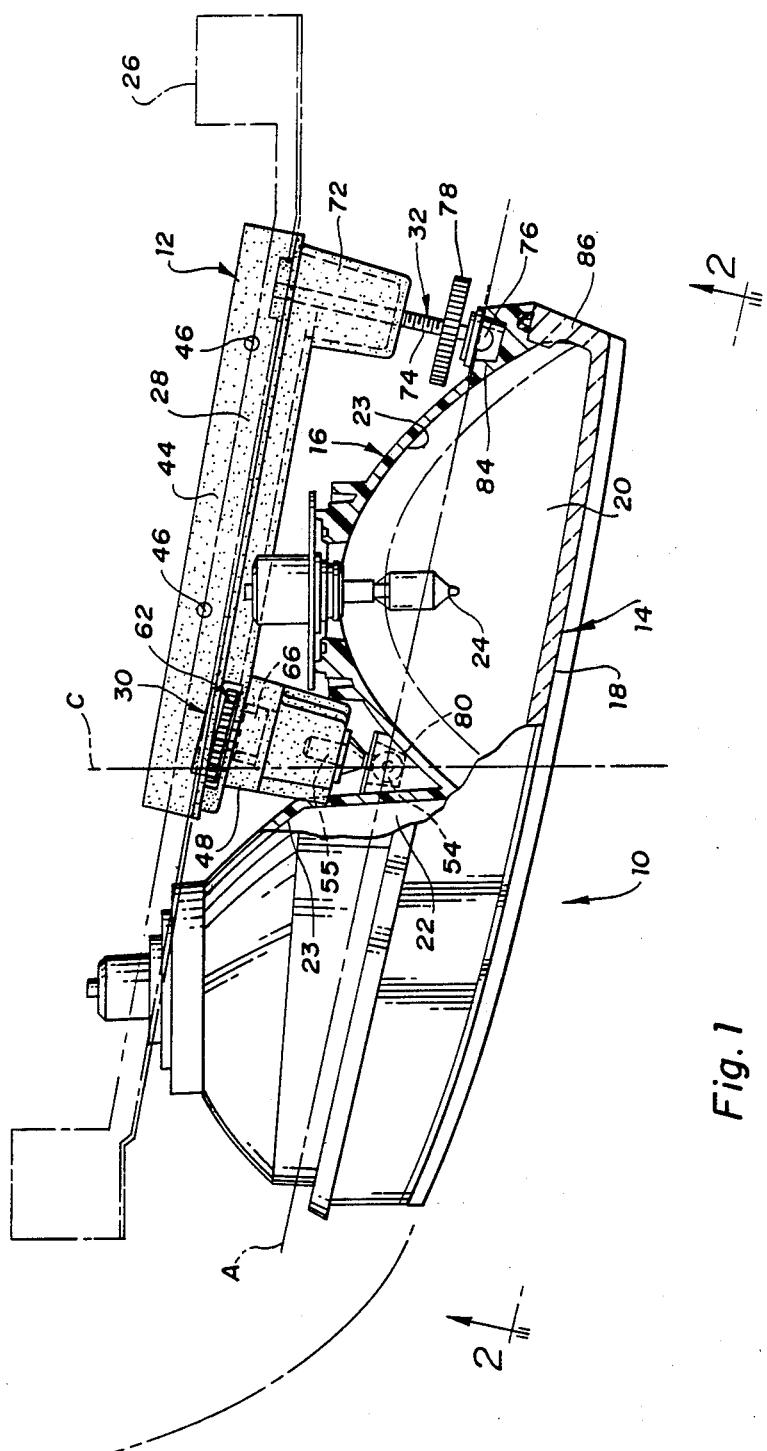

Referring now to the drawings and more particularly FIG. 1 thereof, a headlamp assembly 10 is shown of the replaceable light bulb composite type made in accordance with the present invention. The headlamp assembly 10 includes a mounting bracket 12 which carries a lamp body 14 for selective adjustable movement in a horizontal plane containing a horizontal aim axis A and in a vertical plane containing a substantially vertical aim axis B. The lamp body includes a plastic reflector member 16 enclosed by a glass or the like lens 18 and formed with a pair of side by side parabolic cavities 20 and 22 the concave surfaces 23 of each of which is aluminized so as to project a light beam emanating from an associated replaceable light bulb 24 forwardly and substantially parallel to an axis C. It will be noted that as shown in FIG. 1, the axis C is parallel to the longitudinal center axis of the vehicle and the headlamp assembly 10 would be the left hand unit when looking towards the front of the vehicle as seen in FIG. 2. As should be apparent, the angled position of the headlamp assembly 10 is due to the rounded streamline front end design which is currently popular with motor vehicles. Also each light bulb 24 in the cavities is provided with a single filament located so as to cause the associated parabolic surface to project a light beam forwardly of the vehicle. The light bulb in the cavity 22 allows the associated aluminized parabolic surface 23 to project a so-called "low beam" when energized while the light bulb in the cavity 20 will project the so-called "high beam" when energized. Thus, the lamp body 14 is actually two separate headlamps, a low beam unit and a high beam unit, joined together so as to facilitate aiming adjustment of both lamps.

The mounting bracket 12 is made of a plastic material and is adapted to be secured to the sheet metal 26 of the motor vehicle at the front end thereof and, in its preferred form, has a main body portion 28 that is generally L-shaped as seen in FIG. 2 and includes a pair of laterally spaced adjustment mechanisms 30 and 32 for positioning the lamp body 14 about the aforementioned aim axes. The adjustment mechanism 30 is located within the vertical leg portion of the mounting braket 12 while the adjustment mechanism 32 is located at the terminal end of the horizontal leg portion of the mounting bracket 12. It will be noted that the lower end of the vertical leg portion is formed with an integral downwardly extending tab 34 which is received within a pocket 36 provided in the sheet metal 26 of the vehicle. Similarly, the terminal end of the horizontal leg portion has an integral depending foot 38 which is formed with a tab 40 that is received by a pocket 42 provided in the sheet metal 26 of the vehicle. In addition, the horizontal leg portion of the mounting bracket, as seen in FIG. 1 has an integral rearwardly extending flange 44 which allows the top portion of the mounting bracket 12 to be secured to the vehicle sheet metal 26 by use of threaded fasteners or the like which extend through a pair of circular apertures 46 formed in the flange 44.

As best seen in FIG. 1, 3, and 4 the adjustment mechanism 30 is located within a housing 48 which projects forwardly outwardly from and is integral with the vertical leg portion of the mounting bracket 12. The upper and lower portions of the housing 48 are formed with through bores 50 and 52, the former of which has a ball pivot 54 with integral stud 55 press-fitted therein while the latter serves to rotatably accommodate a stub shaft 56 fixed to a driven spur gear member 58. In addition, the upper portion of the housing is formed with an integral cylindrical bearing member 60 which rotatably receives a thumb wheel member 62. The thumb wheel member 62 has a drive spur gear member 64 fixed thereto which is drivingly connected to the driven gear member 58 by a drive belt 66 having spur gear teeth formed on the inner surface thereof which mesh with the gear teeth of the driven gear member 58 and the drive gear member 64. Thus, when the thumb wheel member 62 is rotated in one direction or the other, the drive gear 64 causes the belt 66 to rotate the driven gear 58 in a corresponding direction. In this regard, it will be noted that the stub shaft 56 and gear member 58 have a threaded bore formed therein which threadably engages the threads formed on the entire length of a screw shaft 68 the front end of which is fixed to a ball pivot 70. The ball pivot 70 is restrained from rotation about the longitudinal center axis of the shaft 68 so that, when the driven gear 58 is rotated, the ball pivot 70 will move longitudinally fore and aft causing repositioning of the ball pivot 70 and adjustment of the lamp body 14 as will be more fully explained hereinafter.

The outer adjustment mechanism 32 is carried by an enlarged section 72 integral with and extending forwardly from the terminal end of the horizontal leg portion of the mounting bracket 12. In this case, a shaft 74, which also has its entire length formed with threads, is integrally formed with a ball pivot 76 located at the front end thereof is threadably received by the enlarged section 72. Also, a thumb wheel member 78 is fixed to the shaft 74 adjacent the ball pivot 76 so that upon rotation of the thumb wheel member 78, the shaft 76 will move into or out of the enlarged section 72 depending upon the direction of the rotation of the thumb wheel member 78 and cause longitudinal movement of the ball pivot 76.

As alluded to hereinbefore, the mounting bracket 12 carries the long body 14 or adjustable movement about the aim axes A and B. In this regard and as seen in FIGS. 1 through 3, the ball pivots 54, 70 and 76 incorporated with the mounting bracket 12 serve to support the lamp body 14 for adjustable movement about the aim is A which passes through the centers of the ball pivots 54 and 76 And also about the aim axis B which passes through the centers of the ball pivots 54 and 70. The ball pivot 54 is received within a plastic socket 80 snapped into and maintained within a square aperture formed in an upper portion of the reflector member 16 between the cavities 20 and 22. The ball pivot 70 fixed with the shaft 68 is also received by a plastic socket 82 which is snapped into and maintained within a square aperture located at a lower portion of the lamp body 14. In the case of the socket 82, however, the ball pivot 70 is maintained therein so that it is non-rotatable about the longitudinal axis of the associated shaft 68. Finally, it will be noted that the ball pivot 76 is located within a plastic socket 84 located in a square aperture formed in the reflector member 16 at the upper portion thereof and adjacent the inner side 86 of the lens 18.

As should be apparent, the lamp body 14 and the mounting bracket 12 can be preassembled so when the headlamp assembly 10 arrives at a vehicle assembly plant, the headlamp assembly 10 can be mounted on the vehicle as a unit. On the other hand, if need be, the lamp body 14 and the mounting bracket 12 can be shipped as individual parts and quickly assembled at the plant by merely having the ball pivots 54, 70 and 76 snapped into the accommodating sockets 80, 82 and 84 in the lamp body 14. In either case, once the lamp body 14 is assembled to the mounting bracket 12, the latter will be secured to the vehicle by first positioning the tabs 34 and 40 within the accommodating pockets 36 and 42 respectively and afterwards securing the flange 44 to the sheet metal of the vehicle body. The proper aim the lamp body 14 can subsequently be realized by rotating the thumb wheel members 62 to position the lamp body 14 about the horizontal aim axis A and by rotating the other thumb wheel member 78 to position the lamp body about the vertical aim axis B.

Although not shown, it should be apparent that rather than utilizing the belt 66 between the drive gear 64 and the driven gear 58, an idler gear could be rotatably supported by the housing 48 between the two gears 64 and 58 to similarly accomplish longitudinal movement of the shaft 68.

Figure 5:
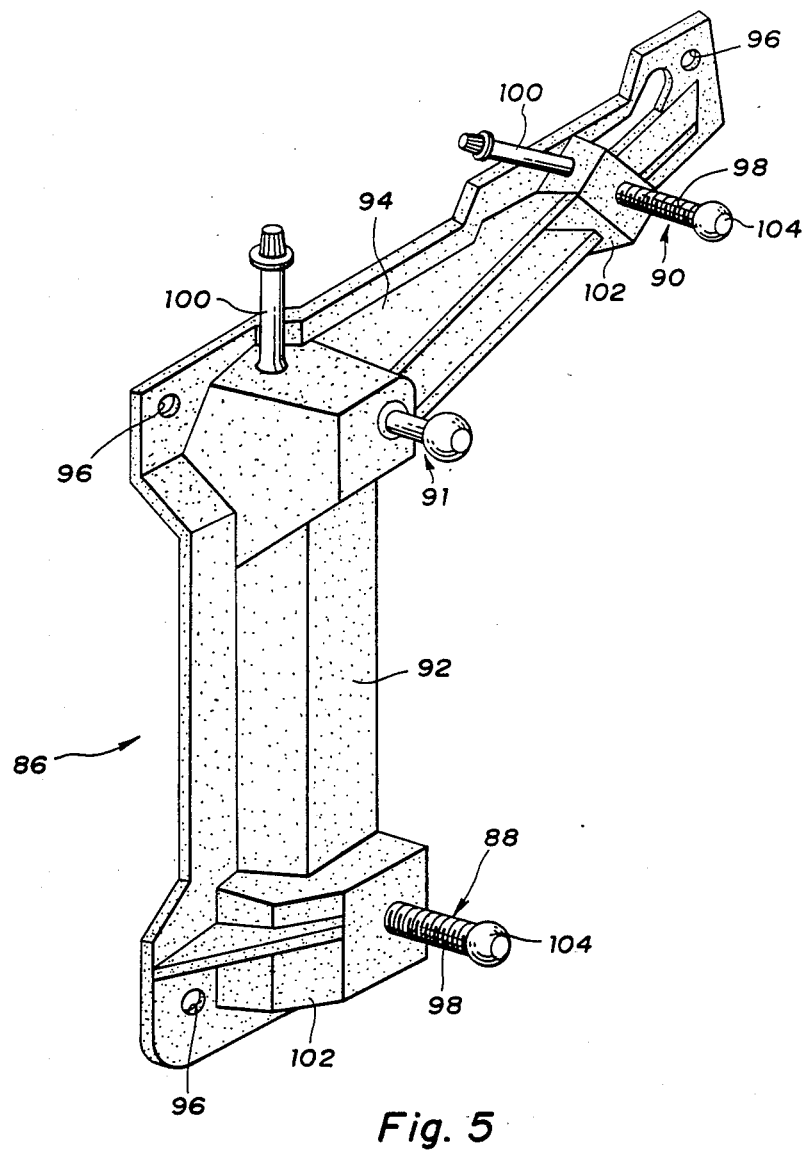
FIG. 5 is a perspective view of a modified form of the mounting bracket.

FIG. 5 of the drawings shows a modified form of the mounting bracket 12. In this instance, the mounting bracket shown and identified by the reference numeral 86 is similar to the mounting bracket 12 in that it also is generally L-shaped in configuration and incorporates a pair of adjustment devices 88 and 90 and fixed ball pivot 91 located at the intersection of the vertical leg 92 and the horizontal leg 94 of the mounting bracket 86. Each of the legs 92 and 94 are provided with a plurality of circular openings 96 through each of which a fastener such as a screw can extend for securing the mounting bracket 86 to the vehicle. The mounting bracket 86, however, differs from the mounting bracket 12 in that the adjustment devices 88 and 90 each employ a pair of orthogonally arranged shafts 98 and 100 which are interconnected by a pair of bevel gears (not shown) located in a gear housing 102 so that upon rotation of the shaft 100 the ball pivot 104 associated with the screw shaft 98 will move longitudinally and position the associated lamp body (not shown) about a horizontal aim axis or a vertical aim axis in the manner explained above relative to the headlamp assembly 10. Adjustment devices of the type incorporated with mounting bracket 86 can be seen in the aforementioned U.S. patent Van Duyn et al 4,742,435.

Various changes and modifications can be made in this construction without departing from the spirit of the invention. Such changes and modifications are contemplated by the inventor and he does not wish to be limited except by the scope of the appended claims.

The embodiments of the invention in which an exclusive property or privilege is claimed are defined as follows:

1. A headlamp assembly for a motor vehicle including a lamp body and a mounting bracket, said mounting bracket supporting said lamp body for selective adjustable movement about a vertical aim axis and a horizontal aim axis and having a generally L-shaped configuration one leg of which supports a first longitudinally adjustable ball pivot and a fixed ball pivot the centers of both of which are located along said vertical aim axis, a second longitudinally adjustable ball pivot supported by the other leg of said mounting bracket with the center of said second ball pivot being located along said horizontal aim axis, socket means for connecting each of said ball pivots to said lamp body, and means on said mounting bracket for rigidly connecting said mounting bracket to said motor vehicle so that said mounting bracket maintains a stationary position during the selective adjustable movement of said lamp body about said vertical aim axis and said horizontal aim axis.

2. A headlamp assembly for a motor vehicle including a lamp body and a mounting braket, said mounting bracket supporting said lamp body for selective adjustable movement about a vertical aim axis and a horizontal aim axis, said mounting bracket having a generally L-shaped configuration one leg of which supports a first longitudinally adjustable ball pivot and a fixed ball pivot the centers of both of which are located along said vertical aim axis, a second longitudinally adjustable ball pivot supported by the other leg of said mounting bracket with the center of said second ball pivot being located along said horizontal axis, socket means for connecting each of said ball pivots to said lamp body, and tab means depending from each leg of said mounting bracket for rigidly connecting said mounting bracket to said motor vehicle.

3. A headlamp assembly for a motor vehicle including a lamp body and a mounting bracket, said mounting bracket supporting said lamp body for selective adjustable movement about a vertical aim axis and a horizontal aim axis, said mounting bracket having a generally L-shaped configuration, one leg of said mounting bracket being vertically orientated and supports a first longitudinally adjustable ball pivot at the lower portion thereof a fixed ball pivot carried by the upper portion of said mounting bracket, the centers of both said first longitudinally adjustable ball pivot and said fixed ball pivot being located along said vertical aim axis, a second longitudinally adjustable ball pivot supported by the other leg of said mounting bracket with the center of said second ball pivot being located along said horizontal axis, socket means for connecting each of said ball pivots to said lamp body, tab means depending from each leg of said mounting bracket for location within pocket portions formed on said motor vehicle, and a flange portion on said mounting bracket for rigidly securing the upper portion of said mounting bracket to said motor vehicle.

4. A headlamp assembly for a motor vehicle including a lamp body and a mounting bracket, said mounting bracket supporting said lamp body for selective adjustable movement about a vertical aim axis and a horizontal aim axis and having a generally L-shaped configuration one leg of which supports a first longitudinally adjustable ball pivot and a fixed ball pivot the centers of both of which are located along said vertical aim axis, a second longitudinally adjustable ball pivot supported by the other leg of said mounting bracket with the center of said second ball pivot being located along said horizontal aim axis, socket means for connecting each of said ball pivots to said lamp body, means carried by and accessible from above the mounting bracket for moving the first and second longitudinally adjustable ball pivots, and means on said mounting bracket for rigidly connecting said mounting bracket to said motor vehicle so that said mounting bracket maintains a stationary position during the selective adjustable movement of said lamp body about said vertical aim axis and said horizontal aim axis.

* * * * *